United States Patent

Swan, Jr. et al.

[15] 3,651,338

[45] Mar. 21, 1972

[54] WAVEFORM GENERATOR

[72] Inventors: William O. Swan, Jr., Saratoga; David M. Krupp, Palo Alto, both of Calif.

[73] Assignee: Anderson Jacobson, Inc., Mountain View, Calif.

[22] Filed: Nov. 7, 1969

[21] Appl. No.: 874,847

[52] U.S. Cl. ..............................................307/227, 328/186
[51] Int. Cl. ..........................................................H03k 7/00
[58] Field of Search .......................307/227; 328/186, 27, 14

[56] References Cited

UNITED STATES PATENTS

| | | | |
|---|---|---|---|
| 3,215,860 | 11/1965 | Neumann | 307/227 |
| 3,227,889 | 1/1966 | Paynter | 307/227 X |
| 3,491,282 | 1/1970 | Heinrich et al. | 307/227 X |

*Primary Examiner*—Donald D. Forrer
*Assistant Examiner*—B. P. Davis
*Attorney*—Lindenberg, Freilich & Wasserman

[57] ABSTRACT

A generator for generating a waveform containing only a fundamental frequency and all odd harmonics except the third. The generator includes a transistor connected in a common base configuration. The transistor's emitter current is made to be a function of the states of the three stages of a clocked circulating shift register. The current contribution of the middle stage to the emitter's current is twice that of either the first or the last stage. The register is controlled to circulate through a six state sequence. The output waveform consists of a succession of six step sequences where each of two of the transitions of each sequence has an amplitude which is double the amplitudes of the transitions which precede and succeed it in the sequence.

4 Claims, 3 Drawing Figures

| B1 | B2 | B3 |
|---|---|---|
| 0 | 0 | 0 |
| 1 | 0 | 0 |
| 1 | 1 | 0 |
| 1 | 1 | 1 |
| 0 | 1 | 1 |
| 0 | 0 | 1 |

INVENTORS
WILLIAM O. SWAN JR.
DAVID M. KRUPP
BY Lindenberg & Freilich
ATTORNEYS

WAVEFORM GENERATOR

BACKGROUND OF THE INVENTION

1. Field of the Invention

The present invention relates to a signal waveform generator and, more particularly, to a generator of a novel signal waveform containing a fundamental frequency, without the second through fourth harmonics.

2. Description of the Prior Art

Many oscillators are known which generate signals of desired fundamental frequencies. The less expensive models, in addition to generating the derived fundamental frequencies, also produce the lower order harmonics, such as the second, third and fourth harmonics. The closer the harmonics are to the fundamental frequency the more complex and expensive is the filtering circuitry, needed to reject the various harmonics from the fundamental frequency. It would be highly desirable to provide a very simple and inexpensive oscillator or signal generator capable of generating a waveform of a signal of a fundamental frequency without the second, third and fourth harmonics. Such a waveform could be filtered by a relatively inexpensive filter which would reject the fifth and higher order harmonics, and provide only the desired fundamental frequency.

OBJECTS AND SUMMARY OF THE INVENTION

It is a primary object of the present invention to provide a new signal waveform generator.

Another object is to provide a simple and highly reliable, yet relatively inexpensive, generator for generating a waveform of a signal which includes a fundamental frequency without its second, third and fourth harmonics.

These and other objects of the invention are achieved by providing a signal waveform generator or oscillator which generates a unique, rectangularly shaped waveform in which each signal cycle is represented by a unique sequence of six successive levels or steps. Such a waveform contains only a fundamental frequency and harmonics other than the second, third and fourth harmonics. Thus, the waveform is easily filterable to produce a sinusoidal waveform of the fundamental frequency only.

The generator includes a three-stage clockable, circulating shift register in which the complement of the output of the last stage serves as the input to the first stage. The shift register is controlled so that the states of the three stages advance through a six state sequence. Each state in the sequence is represented by a different combination of states of the register's stages. Each register stage is in either of two binary states, hereinafter referred to as a binary 1 or a binary 0. It is the states of the three stages of the registers which are used for current summing purposes in the emitter of a transistor, connected in a common base (CB) configuration. Changes of the transistor's collector voltage form the output waveform.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
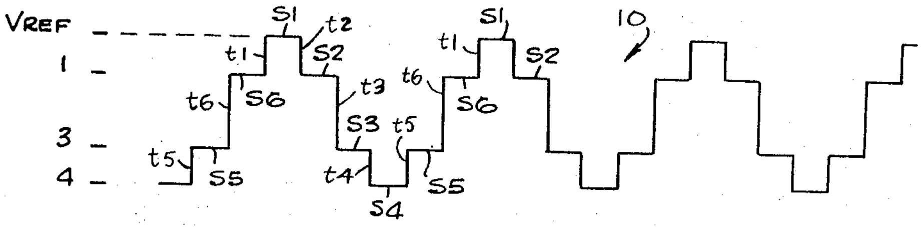
FIG. 1 is a diagram of a signal waveform, generated by the novel generator of the present invention.
Figures 2, 3:
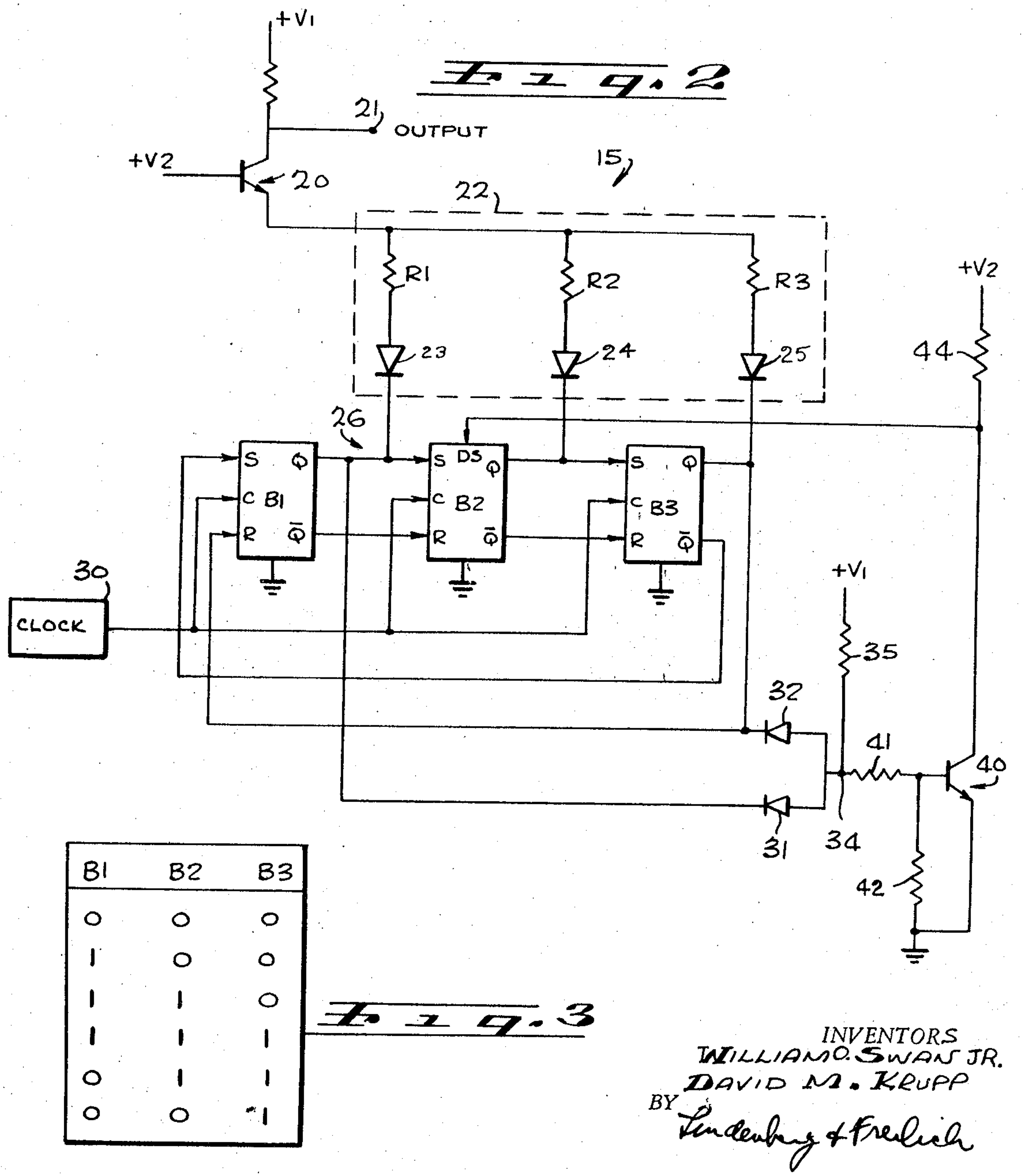
FIG. 2 is a schematic and block diagram of one embodiment of the generator.
FIG. 3 is a chart of a six state sequence of a shift register shown in FIG. 2.

Before proceeding to describe the novel waveform generator of the present invention, reference is made to FIG. 1 which is a diagram of a waveform, produced by the invention's generator, shown in block and schematic form in FIG. 2. In FIG. 1, the waveform, designated by numeral 10, is shown comprising a succession of six-step rectangular sequences. The six steps which are of equal length are designated S1–S6. Assuming that step S1 is at a reference level designated $V_{REF}$, steps S2–S6 are at levels of 1, 3, 4, 3 and 1 units below $V_{REF}$. If the level of S4 were regarded as a reference level, the levels of the next succeeding five steps S5, S6, S1, S2 and S3 are at 1, 3, 4, 3 and 1 units above the level of S4.

As is appreciated by those familiar with the art of signal oscillators or signal waveform generators, a conventional rectangularly shaped waveform does not contain even harmonics. However, it does contain the fundamental frequency together with the third and all higher order odd harmonics. It has been discovered that a waveform, such as waveform 10, which includes in each six-step sequence two transitions, such as *t*3 and *t*6, each with an amplitude which is twice the amplitude of each of the two transitions preceding and succeeding it, such as *t*2 and *t*4 on opposite sides of *t*3, *t*5 and *t*1 on opposite sides of *t*6, does not contain the third harmonic. As used herein a transition represents the difference in amplitude between a preceding step and the step in question.

The waveform essentially contains the fundamental frequency, the fifth and all higher order odd harmonics. Such a waveform is easily filterable to separate the fifth and higher order odd harmonics from its fundamental frequency, since the closest harmonic to the fundamental frequency is the fifth harmonic. This novel waveform is produced by the generator of the present invention, which as shown in FIG. 2, includes a transistor 20, connected in a common base (CB) configuration. The emitter of the transistor 20, which is shown as being of the NPN-type, is connected to a potential, such as ground, through a current-summing network 22 and three stages of a shift register 26. The three stages are designated B1, B2 and B3.

As shown, each stage has set (S), reset (R) and clock (C) input terminals and Q and $\overline{Q}$ of each of stages B1 and B2 are connected to the S and R input terminals of the succeeding stages B2 and B3, respectively, while Q and $\overline{Q}$ of B3 are connected to terminals S and R of B1. Thus, the complement of the output of B3 is used to load B1. The stages of the shift register 25 are assumed to be supplied, at their C input terminals, with clock pulses from a clock 30. The clocking frequency or rate is six times the desired fundamental frequency. The interval between clock pulses, or the clock pulse period, is represented in FIG. 1 by the width of each step in the waveform.

As seen from FIG. 2, the terminal Q of B1 is connected to the emitter of transistor 20 through a resistor R1 and a diode 23 of the current-summing network 22. Similarly, terminals Q of B2 and B3 are connected to the same emitter through serially connected resistor R2 and a diode 24, and resistor R3 and a diode 25, respectively.

Each of stages B1, B2 and B3 is assumed to be a bistable element, such as a flip-flop, which is in either a binary 1 state or a binary 0 state. The register 25 is capable of advancing through a six-state sequence in which each state in the sequence is represented by a different combination of binary states of the three stages. Such a sequence is diagrammed in FIG. 3. As will be pointed out, if for some reason, such as due to initial turn-on, the three stages are in a combined state of 101 or 010, the state sequence becomes limited to these two states only. This is prevented from occurring in the generator of the invention by additional circuitry to be described hereafter.

In accordance with the teachings of the present invention, each stage of the register acts as a switch, providing a path for emitter current between the emitter and ground when the stage is one of the binary states, such as the logic 1 state, while blocking such a path when being in a logic 0 state. Thus, it is clear that the emitter current is a function of the combination of the states of the three stages. That is, the emitter current is different during each of the six states of the sequence shown in FIG. 3.

In the present invention, the resistors R1 and R3 are equal to one another, while the resistance of R2 is half that of either R1 or R3. Consequently, when B2 is in a binary 1 state, its contribution to the emitter current is twice the contribution when either B1 or B3 is in a binary 1 state.

Since in a transistor, such as transistor 20, connected in a common base (CB) configuration, the collector current is directly related to emitter current, the collector potential, present at output terminal 21, is a function of emitter current, the potential decreasing with respect to +V1, as the emitter current increases.

Let it be assumed that the emitter current contribution when either B1 or B3 is in a 1 state results in a collector potential change of 1 unit and that the current contribution when B2 is in a 1 state results in a collector potential change of two units. Therefore, when the combined states of the three stages is 000, the emitter current is essentially 0. Consequently, the output waveform is at a maximum level, such as that represented by step S1 in FIG. 1.

During the next state of the register in the six-state sequence, i.e., when B1, B2 and B3 represent the state 100, emitter current flows only through R1. Consequently, the collector potential drops by one unit as represented by step S2. Then when the register's state is 110, emitter current flows through both R1 and R2. However, since R2 is half of R1, twice as much current flows in R2 than in R1. Thus, B2 contributes two units of change in the collector's potential. Consequently, the collector potential is three units below the maximum level of +V1, as represented by step S3. The output potentials during the other three states of the sequence are represented by steps S4–S6.

The novel generator 15, capable of generating the desired waveform, is quite simple, contributing greatly to its easy and relatively inexpensive implementation. It includes the simple transistor 20 with the three-stage shift register 25 which is used to control the transistor's emitter current through the simple resistive current summing network 22. All of these elements lend themselves to integrated circuitry production techniques, which is significant both from cost and size points of view.

As previously pointed out, the three-stage shift register 26 may be limited to advancing only through a two-state sequence, if the register happens to be in either state 101 or 010. That is, whenever the state of B2 differs from that of B1 and B3 in the case when B1 and B3 are identical. To prevent the register from advancing or circulating in the two-state sequence, as shown in FIG. 2, the outputs of B1 and B3 are fed through diodes 31 and 32, respectively, to a junction point 34, which is connected through a resistor 35 to a potential, such as +V1, and to a base of a transistor 40, through a resistor 41. The base is also connected to ground through a resistor 42. The emitter is directly connected to ground, while the collector is connected to +V2 through a resistor 44, and to a direct-set (DS) input terminal of B2.

Basically, when both B1 and B3 are in the binary 1 state, the transistor 40 is turned on, applying a logical 1 to B2 at its DS terminals. This sets B2 to a binary 1 state. Consequently, all three stages are in a binary 1 state, representing the sequence state 111 in the six-state sequence. Thus, the register is forced into the six-state sequence. It should be pointed out that even when the register circulates through the six-state sequence, whenever the state is 111, since both B1 and B2 are in binary 1 states, a direct set pulse is applied to B2. However, since B2 is already in the binary 1 state, it does not change the register's state of 111. Consequently, the register is free to circulate through the six-state sequence.

Although a particular embodiment of the invention has been described and illustrated herein, it is recognized that modifications and variations may readily occur to those skilled in the art. For example, at the cost of complexity the described embodiment may be modified to generate a waveform with a larger number of steps, such as 12. In such a waveform two steps would be substituted for each step herebefore described. Thus in the 12 step arrangement, four out of the 12 transitions would have amplitudes which are double the amplitudes of the other eight transitions, while in the described embodiment, two out of the six transitions have amplitudes which are double the amplitudes of the other four transitions. Thus, the present invention is intended to include any embodiment of a waveform which includes a fundamental harmonic and odd harmonics other than the third, in which each cycle is represented by $6n$ steps defining transitions one-third of the transitions having amplitudes which are double the amplitudes of the other two-thirds transitions.

Other modifications may be made without departing from the true spirit of the invention. Therefore, it is intended that the claims be interpreted to cover all such modifications and equivalents.

What is claimed is:

1. A generator for generating a six-step waveform comprising:

a shift register including three interconnected bistable elements clockable by clock pulses at a selected rate, each stage being in either of two binary states and providing an output in accordance therewith;

means for controlling said shift register to circulate through a six-state sequence represented by 000, 100, 110, 111, 011 and 001, wherein a 1 represents one binary state, a 0 represents the other binary state, the first, second and third digit of each three digit representation, defining the respective state of the first, second and third bistable element in said register; and means for utilizing the outputs of said three elements for providing a output waveform whose amplitude is a function of the states of said three elements, with the states of said first and third elements contributing equally to the amplitude of said output waveform and the state of said second element contributing twice as much to the amplitude of said output waveform.

2. An arrangement as recited in claim 1 wherein said means for utilizing include current summing means for providing a current sum which equals, one current unit when either said first or said third element are in said first logical state, three current units when said second element and one of the other elements are in said first logical state, and four current units when all three elements are in said first logical state, and means for providing said signal waveform with its amplitude being a function of said current sum.

3. An arrangement as recited in claim 1 wherein said means for controlling include means for driving said second element to assume the same binary state which both said first and third elements assume.

4. An arrangement as recited in claim 3 wherein said means for utilizing include current summing means for providing a current sum which equals, one current unit when either said first or said third element are in said first logical state, three current units when said second element and one of the other elements are in said first logical state, and four current units when all three elements are in said first logical state, and means for providing said signal waveform with its amplitude being a function of said current sum.

* * * * *